US007757397B2

(12) United States Patent
Komuro

(10) Patent No.: US 7,757,397 B2
(45) Date of Patent: Jul. 20, 2010

(54) METHOD FOR FORMING AN ELEMENT SUBSTRATE

(75) Inventor: Hirokazu Komuro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 11/179,543

(22) Filed: Jul. 13, 2005

(65) Prior Publication Data

US 2006/0012641 A1 Jan. 19, 2006

(30) Foreign Application Priority Data

Jul. 16, 2004 (JP) ............................ 2004-210086

(51) Int. Cl.
*B23P 17/00* (2006.01)
*B41J 2/05* (2006.01)

(52) U.S. Cl. .......................... 29/890.1; 29/830; 29/831; 29/832; 29/837; 347/61

(58) Field of Classification Search ................ 29/890.1, 29/830, 832, 831, 837; 347/54, 55, 68–70, 347/71, 50; 216/27, 52, 79, 10
See application file for complete search history.

(56) References Cited

U.S. PATENT DOCUMENTS 4,791,440 A 12/1988 Eldridge et al.
4,889,587 A 12/1989 Komuro ..................... 156/643
4,936,952 A 6/1990 Komuro ..................... 156/643
4,968,992 A 11/1990 Komuro ..................... 346/1.1
5,841,452 A * 11/1998 Silverbrook ................. 347/47
5,994,205 A * 11/1999 Yamamoto et al. .......... 438/464
6,013,534 A * 1/2000 Mountain .................... 438/15
6,139,761 A 10/2000 Ohkuma ...................... 216/27
6,190,005 B1 * 2/2001 Murakami ................... 347/65
6,299,507 B1 * 10/2001 Katoh et al. .................. 451/9
6,332,669 B1 * 12/2001 Kato et al. .................... 347/54
6,527,371 B2 * 3/2003 Yamazaki et al. ............ 347/50
6,569,343 B1 * 5/2003 Suzuki et al. ................. 216/27
6,634,741 B2 * 10/2003 Kataoka et al. ............... 347/92
7,381,341 B2 6/2008 Shimada et al.
2001/0055053 A1 * 12/2001 Kataoka et al. ............... 347/92
2003/0164355 A1 * 9/2003 Park ........................... 216/27
2004/0134881 A1 7/2004 Shimada et al.
2005/0185025 A1 8/2005 Shimada et al.
2006/0012639 A1 1/2006 Komuro ...................... 347/59
2006/0012640 A1 1/2006 Komuro ...................... 347/61

FOREIGN PATENT DOCUMENTS

EP 0 573 023 12/1993
EP 0 609 860 8/1994
EP 0 750 992 1/1997

(Continued)

*Primary Examiner*—Derris H Banks
*Assistant Examiner*—Tai Nguyen
(74) *Attorney, Agent, or Firm*—Fitzpatrick, Cella, Harper & Scinto

(57) ABSTRACT

A method for forming an element substrate which includes a substrate, an ink supply port penetrating substrate and energy supplying means for supplying ejection energy to ink introduced through ink supply port, the method includes a step of forming the energy supplying means on the substrate, then; a step of thinning the substrate, and then; an ink supply port forming step of forming the ink supply port in the substrate.

9 Claims, 5 Drawing Sheets

FOREIGN PATENT DOCUMENTS

| | | | | |
|---|---|---|---|---|
| JP | 63-274556 | A | | 11/1988 |
| JP | 5-330066 | | | 12/1993 |
| JP | 6-286149 | | | 10/1994 |
| JP | 9-11479 | | | 1/1997 |
| JP | 9-24612 | A | | 1/1997 |
| JP | 11-227214 | | * | 8/1999 |
| JP | 11-227214 | A | | 8/1999 |
| JP | 2001-171111 | | | 6/2001 |
| JP | 2002-052709 | | * | 2/2002 |
| JP | 2002-67328 | A | | 3/2002 |
| JP | 2003-127389 | | * | 8/2003 |
| JP | 2004-82722 | A | | 3/2004 |

* cited by examiner

METHOD FOR FORMING AN ELEMENT SUBSTRATE

FIELD OF THE INVENTION AND RELATED ART

The present invention relates to a liquid ejection element for an ink jet recording head and a manufacturing method therefor. In particular, it relates to a liquid ejection element for an ink jet recording head, which employs electrothermal transducers, and a manufacturing method therefor.

As one of the liquid ejection elements used by an ink jet recording head, there is a liquid ejection element which employs electrothermal transducers. Generally, this type of a liquid ejection element comprises a substrate with a thickness of roughly 600 μm, and various functional holes and layers formed in or on the substrate, for example, an ink supply canal, an ink ejecting portion, a heat generation resistor layer for generating thermal energy, a top protection layer for protecting the heat generation resistor layer from ink, a bottom protection layer for storing the heat generated by the heat generation resistor layer, etc. The ink ejecting portion has: orifices through which liquid is ejected; and liquid channels which are connected to the orifices to supply the orifices with ink, and in each of which a heat transfer portion for transferring the thermal energy generated by the heat generation resistor layer to the ink is disposed.

In order for an ink jet recording method to be satisfactory in terms of the quality of the images formed using the ink jet recording method, it is mandatory that the liquid passage, liquid ejection orifices, ink supply canal, etc., of a liquid ejection element to be used by the ink jet recording method are formed at a high level of density and a high level of accuracy. Thus, various methods for forming such a liquid ejection element have been developed. According to one (Japanese Laid-open Patent Applications 5-330066 and 6-286149) of such methods, first, a layer of dissolvable resin is formed, and a cover layer is formed thereon. Then, the orifices are formed in the cover layer, and the layer of dissolvable resin is dissolved to effect the liquid passages. According to another (Japanese Laid-open Patent Application 9-11479) of such methods, the ink supply canal is formed by etching, after the formation of the orifices.

Further, as a method for producing a recording head smaller in size, and also, in the size of the area to which the recording head is attached, it is disclosed to employ through electrodes in order to make electrical connections between the components (heat generation resistors) on the front surface of a substrate, and the components located on the rear side of the substrate (Japanese Laid-open Patent Applications 2002-67328 and 2000-52549).

As described above, in order to improve a liquid ejection element in the quality of the image it forms, it is necessary to form the ink supply canals at a high level of density and a high level of precision. In addition, in order for the employment of the structural arrangement, in which electrical connections are made between the components on the front surface of the substrate and those on the rear surface of the substrate, with the use of through electrodes, to be significantly meritorious from the standpoint of reducing a recording head in size, and also, in the size of the area to which it is mounted, the through electrodes must be arranged in a high level of density, that is, not only must the holes for the through electrodes be reduced in diameter, but also, they must be reduced in arrangement pitch. However, the above described requirements have created the following technical problems, because the ink supply canals and the holes for through electrodes are through holes which must be formed through a substrate with a substantial thickness.

(1) An ink supply canal is formed by etching a substrate. Thus, the thicker the substrate, the lower the level of precision at which an ink supply canal can be formed, for the following reason. That is, the thicker the substrate, the more difficult it is to ensure that the substrate is precisely processed in the direction parallel, as well as perpendicular, to the surface of the substrate, to form an ink supply canal. Thus, the thicker the substrate, the greater the amount of the positional deviation between each of the heat generation resistors and the ink supply canal, which results in the reduction in the liquid ejection performance of a liquid ejection element, in other words, the reduction in the printing performance of a liquid ejection element. Further, the thicker the substrate, the longer the distance by which the substrate must be penetrated to form an ink supply canal, and therefore, the longer the amount of time it takes to process the substrate to form an ink supply canal. Therefore, the thicker the substrate, the lower the level of efficiency at which a liquid ejection element is manufactured, and also, the longer the length of time some of the apparatuses for manufacturing a liquid ejection element must be operated in a vacuum, which will possibly result in the increase in the cost of a liquid ejection element.

(2) In order to arrange a large number of through electrodes at a high level of density, the holes for forming the large number of through electrodes must also be arranged at a high level of density. Each for the through holes for the through electrodes is formed by a laser-based method, dry etching, or the like. Therefore, the thicker the substrate, the more difficult it is to form a large number of through holes at a high level of density.

The primary reason for (2) is the limitation in the level of accuracy at which the substrate can be processed for the formation of a large number of through holes. That is, the thicker the substrate, the more difficult it is to ensure that the substrate is processed at a high level of accuracy in terms of the direction parallel to the diameter direction of a through hole, and also, the direction parallel to the length direction of the through hole. This factor limits the diameter of each through hole for the through electrode, and the pitch at which a large number of holes for the through electrode can be formed through the substrate.

The second reason for (2) is the limitation in the filling of each through hole for the through electrode, with the material for the electrode, by plating. In the case of a method for forming the through electrodes by filling the through holes it the substrate, with a metal, by plating, the thicker the substrate, the greater the ratio of the length of each hole relative to the diameter of the hole, and therefore, the processing of the substrate results in the formation of a long and narrow hole, which is rather difficult to fill by plating. In order for a hole in the substrate to be satisfactorily filled by plating, the hole must be large in diameter, while keeping the same the number of the holes for the through electrodes. This limits the diameter of each hole for the through hole, and the pitch at which the holes for the through electrodes can be arranged, possibly resulting in the reduction in the efficiency with which a liquid ejection element is manufactured, and also, in the increase in the cost for manufacturing a liquid ejection element.

As described above, using a thick substrate makes it virtually impossible to satisfactorily form an ink supply canal and a large number of through electrodes through the substrate at a high level of density and a high level of accuracy, limiting thereby a recording head in terms of its smallest size, recording performance, and its lowest manufacturing cost.

On the other hand, when forming heat generation resistors and electrodes on a substrate, various film forming processes, such as diffusion process or the like, are carried out in a vacuum at high levels of temperature. Thus, using a thin substrate has been problematic in that as the substrate increases in temperature during any of the abovementioned film forming processes, the substrate warps and/or breaks.

SUMMARY OF THE INVENTION

The primary object of the present invention is to provide a liquid ejection element capable of making it possible to provide a liquid ejection head which is substantially smaller in size, substantially greater in recording performance, and substantially lower in cost than a liquid ejection head which can be manufactured by a liquid ejection element manufacturing method in accordance with the prior art, and a method for manufacturing such a liquid ejection element.

According to an aspect of the present invention, there is provided a method for forming an element substrate which includes a substrate, an ink supply port penetrating substrate and energy supplying means for supplying ejection energy to ink introduced through ink supply port, said method comprising a step of forming said energy supplying means on said substrate, then; a step of thinning said substrate, and then; an ink supply port forming step of forming said ink supply port in said substrate.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Embodiment 1

Figure 1:
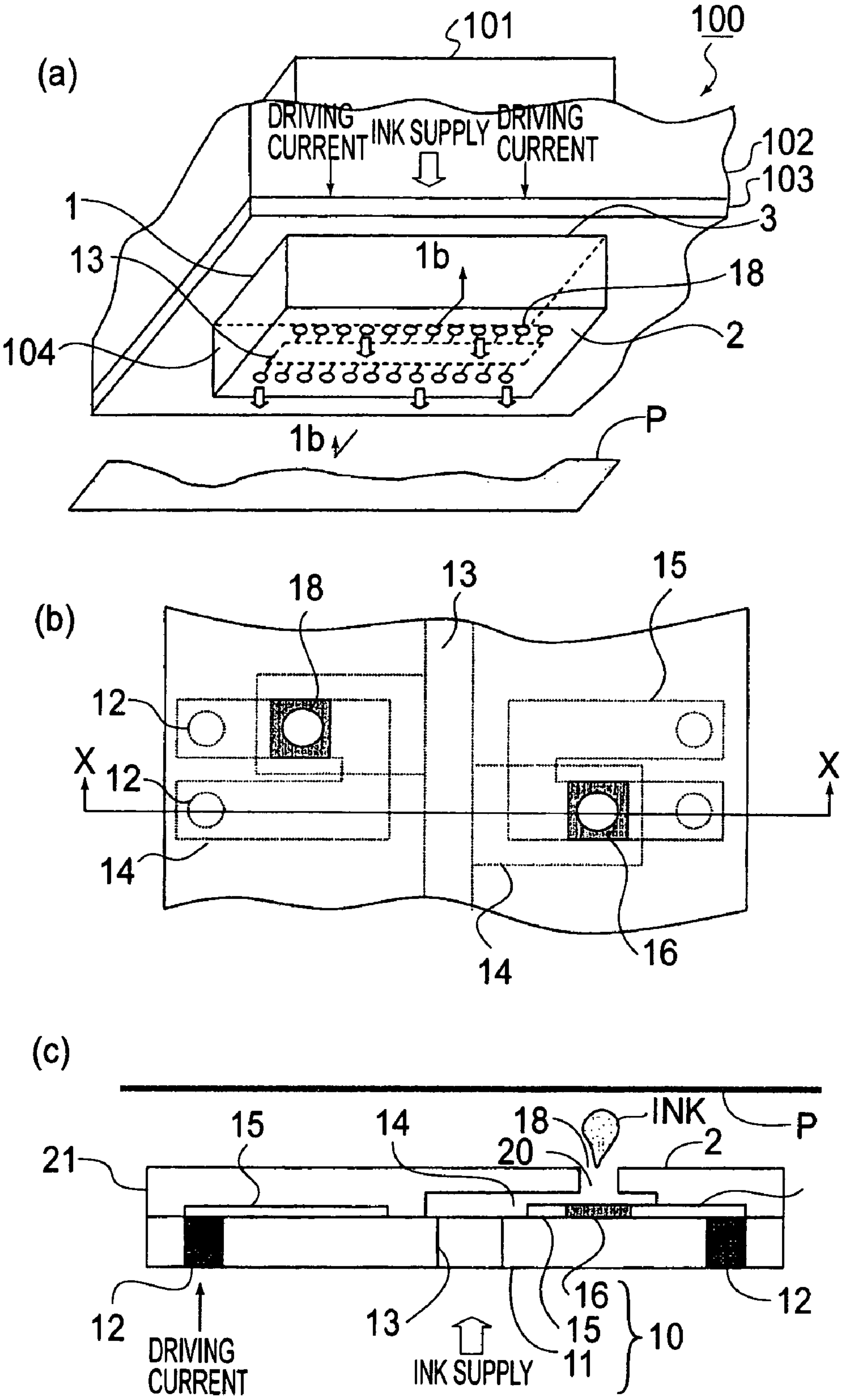
FIG. 1(*a*) is a schematic perspective view of the recording head cartridge in the first embodiment of the present invention, and FIGS. 1(*b*) and 1(*c*) are plan and sectional views, respectively, of the liquid ejection element in the first embodiment of the present invention.

Hereinafter, the structures of the recording head and liquid ejection element in the preferred embodiments of the present invention will be described with reference to the appended drawings. FIG. 1(*a*) is a perspective view of the recording head cartridge as seen from the direction of a sheet of recording medium, and FIG. 1(*b*) is a schematic plan view of the liquid ejection element in the first embodiment of the present invention, as seen from Line 1*b*-1*b* (from recording medium side) in FIG. 1(*a*), and FIG. 1(*c*) is a schematic sectional view of the liquid ejection element, at the plane which is perpendicular to the surface of the liquid ejection element and coincides with Line X-X in FIG. 1 (*b*).

A recording head cartridge 100 has an ink container 101, an ink container holder 102, a base plate 103, a liquid ejection element 1, etc. The ink container holder is capable of holding the ink container 101. The liquid ejection element 1 is held to the base plate 103 so that the primary surfaces of the liquid ejection element 1 face the ink container holder and a sheet of recording medium, respectively. The ink container 101 may be attached to the recording head cartridge 100, either removably or unremovably. The base plate 103 may be provided with the circuit for driving the ink ejection element 1, electrical wiring therefor, etc. The recording head cartridge 100 may be structured so that it can be fitted with multiple liquid ejection elements 1 different in the color of the inks they eject. In such a case, the multiple liquid ejection elements are attached to the same base plate 103. The integral combination of the base plate 103 and a single or multiple liquid ejection elements 1 makes up a recording head 104. It is from its rear side, that is, the side which faces a sheet P of recording medium (which hereinafter will be referred to simply as recording medium P) that the liquid ejection element 1 is supplied with ink (indicated by thick blank arrow mark in FIG. 1(*a*)) and the current for driving the liquid ejection element 1. The surface 2 of the liquid ejection element 1, which faces the recording medium P has the external openings of multiple ejection orifices 18. As the liquid ejection element 1 is driven, that is, the liquid ejection element 1 is supplied with the electric current, liquid droplets are ejected from the openings of the selected ejection orifices 18 of the liquid ejection elements 1, effecting an image on the recording medium P.

The liquid ejection element 1 comprises a substrate 11, multiple element substrates 10, and an orifice plate 21. The substrate 11 has an ink supply canal 13 as a means for supplying the liquid ejection element 1 with ink. Each element substrate 10 is a means for giving thermal energy to the ink, and has the combination of an electrical wire 15 and a heat generation resistors 16. The orifice plate 21 has multiple ink channels 14, and multiple orifices 20 as means for ejecting liquid droplets. The ink supply canal 13 is a slit which runs from one edge of the substrate 11 to the other, and the electric wires 15 and heat generation resistors 16 are on the surface of the substrate 11. The substrate 11 is formed of silicon, for example. Its thickness, which will be described later in more detail, is set according to various factors: how strong the substrate 11 should be after its thinning, how easy it should be to handle the substrate 11 after thinning, the level of precision at which the substrate 11 can be processed to form the through holes 22 for the through electrodes 12 (FIGS. 2-5) and ink supply canal 13, and the cost for processing the substrate 11. However, the thickness of the substrate 11 is desired to be in a range of roughly 50 μm-300 μm.

The substrate 11 is provided with the ink supply canal 13 in the form of a slit, which is roughly 100 μm wide and extends in the direction in which the ejection orifice openings 18 are aligned, from one edge of the substrate 11 to the other. From the ink supply canal 13, the multiple liquid channels 14 branch toward the ejection orifice openings 18, one for one. Incidentally, the substrate 11 may be provided with only a single, or multiple, ink supply canals in the form of a slit. The liquid channel 14 are the spaces created between the substrate 11 and orifice plate 21. The orifices 20 of the orifice plate 21 directly face the heat generation resistors 16, one for one. One end of each orifice 20 is connected to the corresponding liquid channel 14, and the other end is open as the ejection orifice opening 18 at the outward surface 2 of the orifice plate 21, which will face the recording medium P. Therefore, as ink comes out of the ink container 101, it travels through the ink supply canal 13, fills the liquid channels 14, and then, fills the orifices 20 to which the channels 14 lead, one for one. The orifice plate 21 is a piece of ordinary resin film, through which nozzles with the ejection orifices are formed with the use of a laser, or a piece of photosensitive epoxy resin film, through which nozzles with the ejection orifices are formed by exposure and development.

The liquid ejection element 1 is provided with multiple electrical wires 15, in the form of a letter U, which is formed of aluminum. Each end of each electrical wires 15 is connected to the through electrode 12, which extends from the front surface 2 of the liquid ejection element 1, to the rear surface 3 of the liquid ejection element 1, being thereby enabled to transmit the liquid ejection element driving current according to the contents to be recorded. The portion of each electrical wire 15, which overlaps with the corresponding liquid channel 14 in terms of the direction perpendicular to the surface of the electrical wires 15, is provided with one of the heat generation resistors 16, the outward surface of which is square, being roughly 30 μm long in both the direction parallel to the lengthwise direction of the ink ejection element and the direction perpendicular to the lengthwise direction of the liquid ejection element 1. Each heat generation resistor 16 is sandwiched by the top protective layer (unshown) for protecting the heat generation resistor 16 from ink, and the bottom layer (unshown) for storing the heat generated by the heat generation resistor 16. The heat generating resistor 16 is made to generate heat, by the current supplied thereto through the electrical wire 15, and heats the ink within the corresponding liquid channel 14, through the top protective layer, with the heat it generates. As the ink is heated, a bubble (bubbles) is generated in a part of the body of ink in the ink channel 14, and the liquid (ink) in the orifice 20 is ejected in the form of an ink droplet (ink droplets) by the pressure generated by the growth of the bubble. The ink droplet(s) ejected from the orifice 20 adheres to the recording medium P, creating thereby one of the numerous points of an image to be formed on the recording medium P, in accordance with the recording data.

Figure 2:
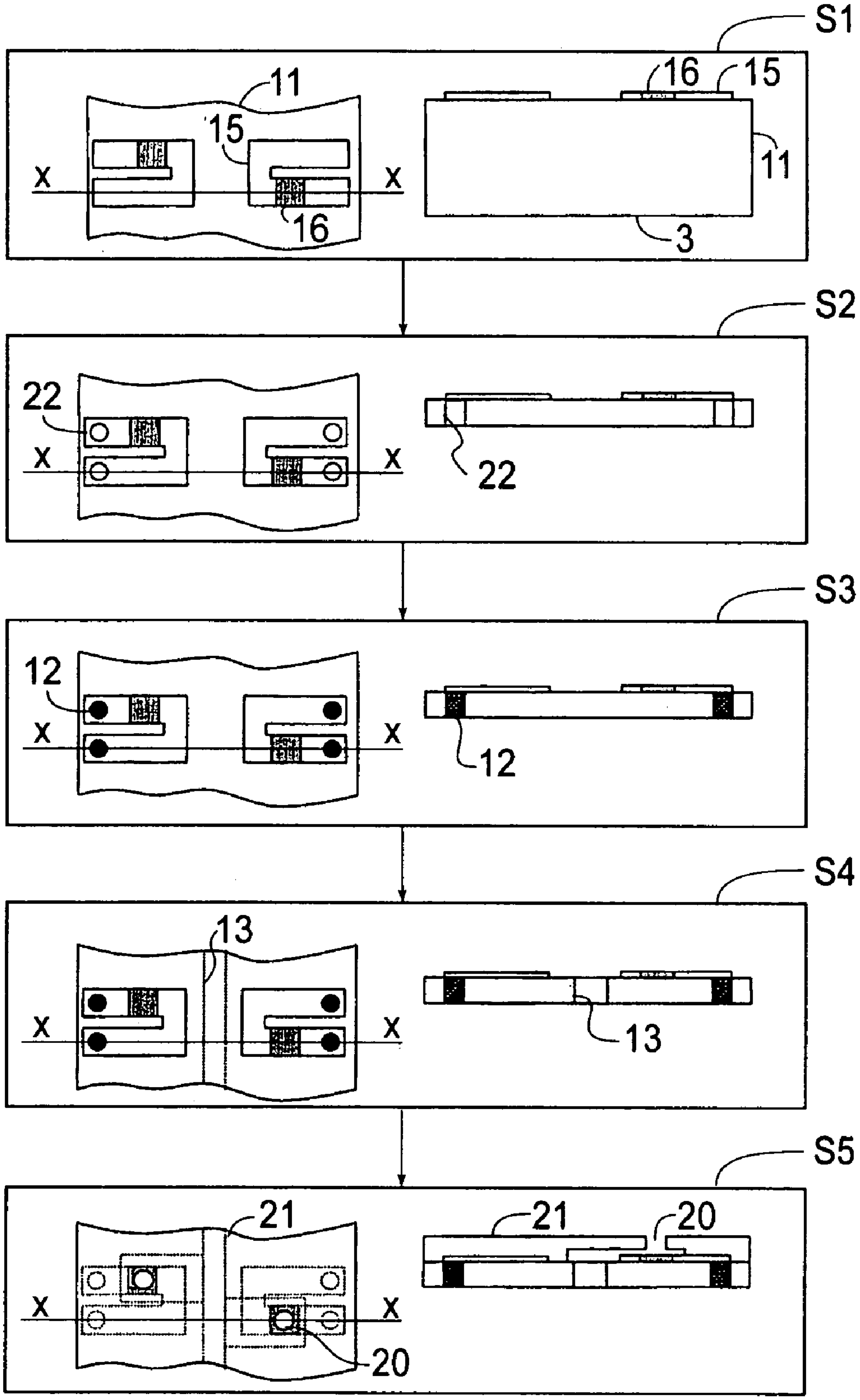
FIG. 2 is an illustrative flowchart of the liquid ejection element manufacturing method in the first embodiment of the present invention.

Next, one of the methods, in accordance with the present invention, for manufacturing the above described liquid ejection element will be described. FIG. 2 sequentially shows the steps of the process for manufacturing the liquid ejection element in the first embodiment of the present invention. In each of the individual drawings in FIG. 2, the left portion is a plan view of a part of the liquid ejection element, as seen from the same direction as the direction in which the liquid ejection element is seen in FIG. 1(*b*), and the right-hand portion is a sectional view of the same part of the liquid ejection element as that in the left portion of the drawing, at the plane which is perpendicular to the primary surfaces of the substrate 11 and coincides with Line X-X in the left portion of the drawing. The description of FIG. 2 regarding the setup of the individual drawings thereof is also applicable to FIGS. 3-5.

(Step S1)

First, a film of TaN and a film of Al, which are 625 μm in thickness, are formed on the substrate 11 by sputtering, and are processed by photolithographic technologies to form multiple heat generation resistors 16, and multiple electrical wires 15 for supplying the heat generation resistors 16 with electric power, one for one. These processes are carried out under high temperature, subjecting the substrate 11 to high temperatures. In this embodiment, however, a piece of silicon wafer, which is substantially thicker than the substrate 11, is used as the precursor of the substrate 11, being thereby prevented from warping and/or breaking.

(Step S2)

Next, the precursor of the substrate 11 is ground at the rear surface 3 to reduce the thickness of the substrate 11 to a value in a range of 50-300 μm. After the grinding, the rear surface of the substrate 11, which will possibly have been roughened by the grinding, may be smoothed as necessary by the CMP (chemical-mechanical planing), or spin etching. As for the thickness of the substrate 11 after thinning, it is determined according to various factors, for example, the cost for the formation of the through holes for the through electrodes, the cost for the formation of the ink supply canal, and the required level of ease at which the substrate 11 is to be enabled to be handled, for example, when the substrate 11 needs to be conveyed. Then, the portions of the substrate 11, which correspond in position to the through electrodes, one for one, are removed from the rear side 3 of the substrate 11, by dry etching to form through holes 22 with an internal diameter of 70 μm. The choice of the method for forming the through holes 22 does not need to be limited to dry etching. For example, a method for processing the substrate 11 with a beam of laser light, or ultrasonic waves, etc., may be used. If necessary, an electrically insulating layer (unshown) may be formed on the internal surface of each through hole 22. In the past, the level of accuracy at which the through holes 22 were formed through a silicon substrate with a thickness of 625 μm was rather low, and the length of time required to process the substrate therefor was rather long. In the past, therefore, the smallest internal diameter achievable for the through holes 22 was roughly 100 μm. In comparison, in this embodiment, the precursor of the substrate 11 is reduced in thickness before forming the through holes 22 for the through electrodes 12. Therefore, it is possible to form the through holes 22 with an internal diameter substantially smaller the smallest through hole diameter achievable with the prior art.

(Step S3)

Next, a seed layer (unshown) for plating is formed on the internal surface of each through hole 22. Then, each through hole 22, the internal surface of which has been covered with the seed layer for plating, is filled with gold by electrolytic plating to form the through electrode 12, which is in electrical connection with the corresponding electrical wire 15.

(Step S4)

Next, the material for a dry etching mask is coated on the surface of the substrate 11, forming a layer of dry etching mask on the surface of the substrate 11. Then, the portion of the masking layer, which corresponds in position to the ink supply canal 13, is removed with the use of photolithography (patterning). Then, a slit as the ink supply canal 13 is formed by dry etching, yielding a precursor of the liquid ejection element.

(Step S5)

Lastly, the orifice plate 21, that is, a piece of resin film, in which the orifices 20 were formed in advance, is bonded to the abovementioned precursor of the liquid ejection element, completing the liquid ejection element 1.

When the above described manufacturing method in this embodiment is used for manufacturing the liquid ejection element 1, the through holes 22 for the through electrodes 12 can be formed through the substrate 11 at a higher level of accuracy, and the time required therefor is substantially shorter, than when a liquid ejection element manufacturing method in accordance with the prior art is employed. Therefore, it is possible to provide a liquid ejection element, which is lower in cost, and higher in the density of the through electrodes 12, being therefore substantially smaller in size (chip size), than a liquid ejection element in accordance with the prior art. Further, the liquid ejection element manufacturing method in this embodiment is superior to that in accordance with the prior art, in terms of the level of accuracy at which the substrate 11 can be processed to form the ink supply canal 13. Therefore, a liquid ejection element manufactured by the manufacturing method in this embodiment is more accurate in terms of the distance between each heat generation resistor 16 and ink supply canal 13, being therefore superior in frequency response, and therefore, superior in liquid ejection performance, to the one manufactured by the manufacturing method in accordance with the prior art.

Embodiment 2

Figure 3:
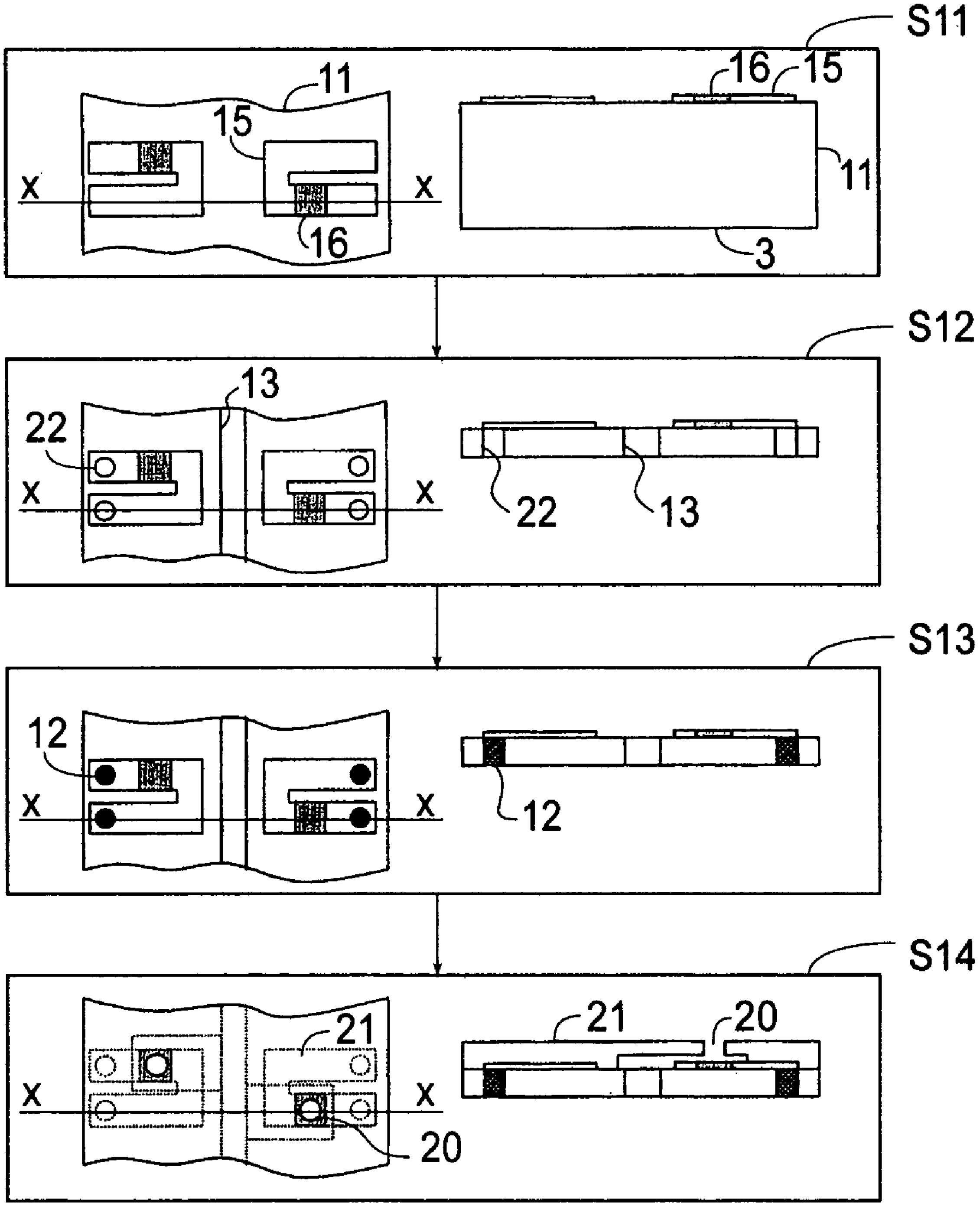
FIG. 3 is an illustrative flowchart of the liquid ejection element manufacturing method in the second embodiment of the present invention.

Next, referring to FIG. 3, the steps of the method, in the second embodiment, for manufacturing a liquid ejection element will be described. This embodiment is similar to the first embodiment except that the through holes for the through electrodes are formed at the same time as a slit as the ink supply canal is formed. Thus, hereinafter, this embodiment will be described while concentrating attention to the difference between the first and second embodiments.

(Step S11)

The heat generation resistors 16 and electrical wires 15 are formed as they are in Step S1.

(Step S12)

The thickness of the precursor of the substrate 11 is reduced to a value in the range of 50-300 μm by shaving the precursor from the rear side 3 as in Step S2. Also, the through holes 22 with an internal diameter of 70 μm are created as in Step S2. Further, at the same time as the through holes 22 are created, the slit as the ink supply canal 13 is formed by dry etching as in Step S4. If necessary, an electrically insulating layer (unshown) may be formed on the internal surface of each through hole 22 (when forming insulating layer, openings of ink supply canal 13 should be covered with dry film or the like). As described above, according to the liquid ejection element manufacturing method in this embodiment, the ink supply canal 13 and the through holes 22 for the through electrodes 12 are formed by etching at the same time. Therefore, not only can this manufacturing method improve the efficiency with which a liquid ejection element is manufactured, but also, reduce the cost of the liquid ejection element.

(Step S13)

The through holes 22 are filled with gold by plating to create the through electrodes 12, yielding thereby a precursor of a liquid ejection element, as in Step S3.

(Step S14)

Next, if the openings of the ink supply canal 13 are have been covered with the film, the film is to be removed. Then, the orifice plate 21 is bonded to the substrate 11 to complete a liquid ejection element 1.

According to this second embodiment, the ink supply canal 13 and the through holes 22 for the through electrodes 12 are formed at the same time, making it possible to substantially reduce the processing cost.

Embodiment 3

Figure 4:
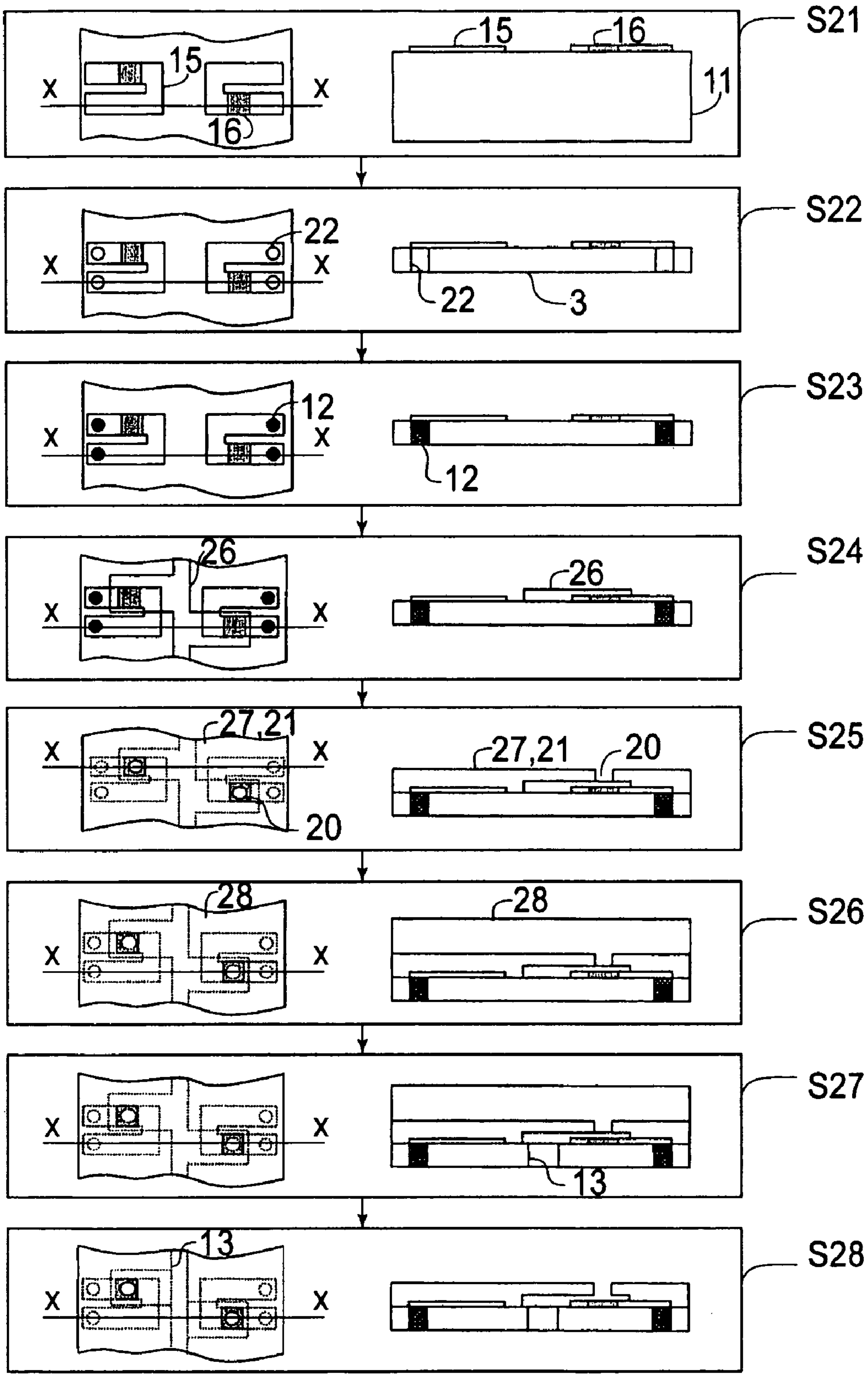
FIG. 4 is an illustrative flowchart of the liquid ejection element manufacturing method in the third embodiment of the present invention.

Next, referring to FIG. 4, the third embodiment of the present invention will be described regarding the steps of the liquid ejection element manufacturing method in this embodiment. This embodiment is different from the first and second embodiments in that in order to improve the level of accuracy at which the orifices are formed and the level of accuracy at which the liquid channels are aligned with the heat generation resistors, one for one, the orifice plate is formed by film layering.

(Steps S21-S23)

The heat generation resistors 16 and electrical wires 15 are formed, the substrate 11 is reduced in thickness from the rear side 3, the through holes 22 are formed, and the through electrodes 12 are formed, as they are in Steps S11-S13.

(Step S24)

Positive resist as the material for forming the mold of the liquid channels is coated to a thickness of 15 μm, and then, a predetermined pattern 26 is formed by exposure and development.

(Step S25)

Photosensitive negative epoxy resin as the material for the orifice plate 21 is coated to a thickness of 30 μm, forming an epoxy film 27. Then, the orifice plate 21 having multiple orifices 20, which are 25 μm in internal diameter, are formed from the epoxy film 27 by exposure and development.

(Step S26)

The outward surface of the orifice plate 21 is coated with resin to form a resin film 28 as a protective film.

(Step S27)

A slit as the ink supply canal 13 is formed in the substrate 11 from the rear side 3 as in Step S4.

(Step S28)

Lastly, the resin film 28 for protecting the orifice plate 21 and the pattern 26 as the mold of the liquid channels are removed, yielding a liquid ejection element. As for the method for removing the pattern 26, the substrate 11 may be dipped in solvent, or sprayed with solvent.

As will be evident from the above description of this embodiment, the liquid ejection element manufacturing method in this embodiment is superior in the level of accuracy at which the orifices and liquid channels are formed, being therefore superior in the level of alignment among the liquid channel, orifices, and heat generation resistors, one for one, compared to the preceding methods (inclusive of method in accordance with prior art). Therefore, it is satisfactorily usable to form a future ink jet recording head which will be much smaller in the size of a liquid droplet it ejects. In other words, it contributes to the improvement in recording performance.

Embodiment 4

Figure 5:
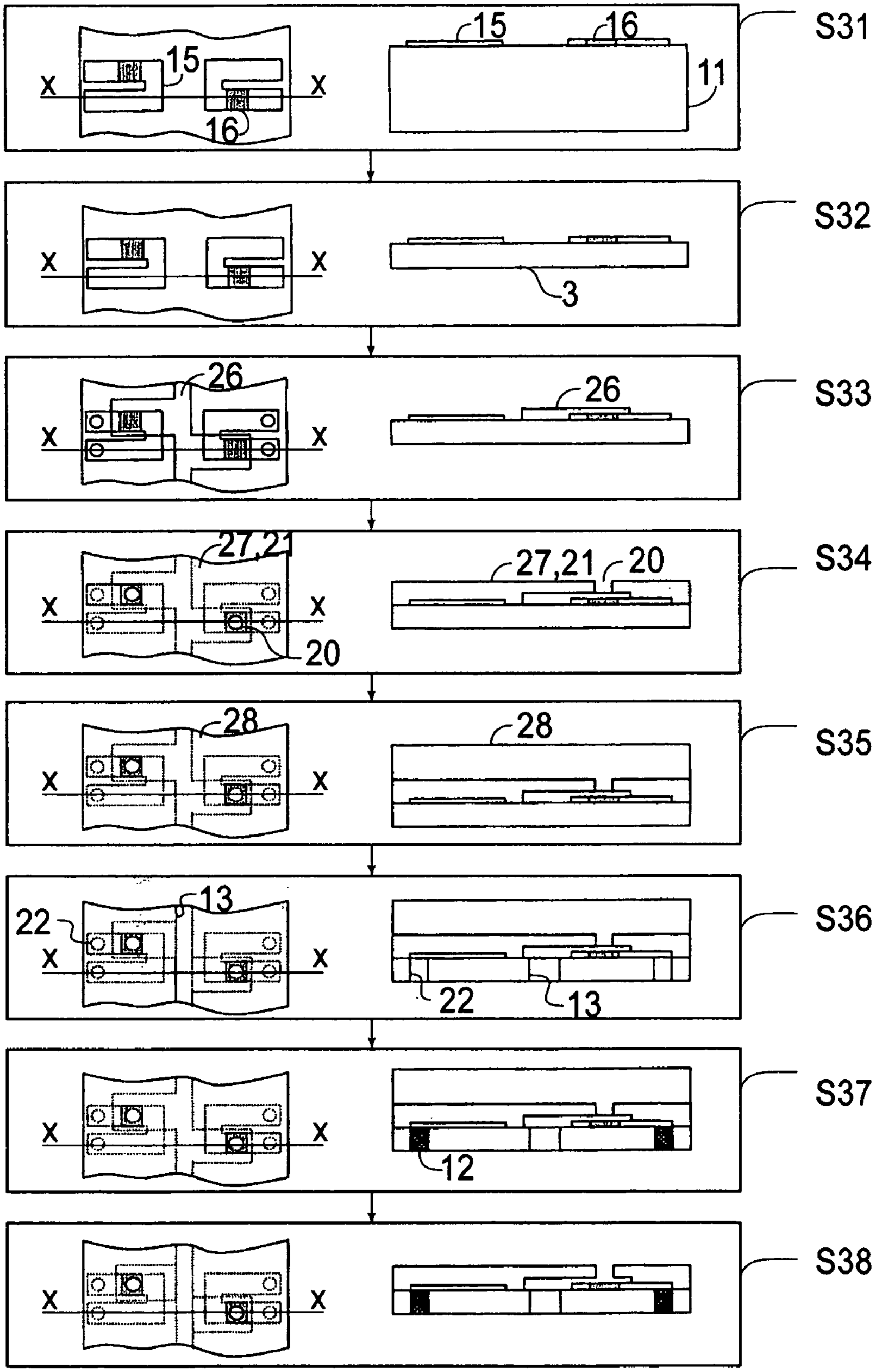
FIG. 5 is an illustrative flowchart of the liquid ejection element manufacturing method in the fourth embodiment of the present invention.

Next, referring to FIG. 5, the steps of the liquid ejection element manufacturing method in the fourth embodiment of the present invention will be described. The liquid ejection element manufacturing method in this embodiment is similar to that in the third embodiment in that the orifice plate is formed by film layering in order to improve the level of accuracy at which the orifices are formed and the level of alignment between the liquid channels and heat generation resistors. But, two methods are different in that the method in this embodiment forms the through holes for the through electrodes, and the through hole for the ink supply canal, at the same time.

(Steps S31-S32)

The heat generation resistors 16 and electrical wires 15 are formed, and the substrate 11 is reduced in thickness from the rear side 3, as they are in Step S2.

(Steps S33-S35)

A predetermined pattern is formed, the orifice plate 21 having the orifices 20 is formed, and the outward surface of the orifice plate 21 is coated with resin to form a resin film 28 as a protective film.

(Step S36)

The material for dry etching mask for forming the ink supply canal 13 and through holes 22 is coated on the substrate 11 to form the mask for dry etching. Then, the pattern for forming a slit as the ink supply canal 13 and the through holes 22 are formed by photolithography, and the slit as the ink supply canal 13 and through holes 22 are formed at the same time by dry etching. If necessary, an electrically insulating layer (unshown) may be formed on the internal surface of each through hole 22 (when forming insulating layer, openings of ink supply canal 13 should be covered with dry film or the like).

(Step S37)

The through holes 22 are filled with gold by plating to create the through electrodes 12, as in Step S3.

(Step S38)

Lastly, if the openings of the ink supply canal 13 have been covered with a film, the film is to be removed. Then, the resin film 28 for protecting the orifice plate 21 and the pattern 26 as the mold of the liquid channels are removed, yielding a liquid ejection element 1.

As will be evident from the above description of this embodiment, compared to the preceding methods (inclusive of method in accordance with prior art), not only is the liquid ejection element manufacturing method in this embodiment superior in the level of accuracy at which the orifices are formed, and the level of alignment between the liquid channels and heat generation resistors, one for one, but also, it can form the ink supply canal, and the through holes for the through electrodes, at the same time, making it possible to substantially reduce the processing cost.

As described above, each of the preceding embodiments of the present invention is characterized in that the heat generation resistors and electrical wires, which must be formed with the use of a high temperature process, are formed on a substrate which is substantially thicker than a substrate used by a liquid ejection element manufacturing method in accordance with the prior art, preventing thereby the substrate from warping and/or breaking due to the high temperatures, and then, after the formation of the heat generation resistors and electrical wires, the substrate is reduced in thickness, and the ink supply canal, and the through holes for the through electrodes, are formed through the thinned substrate, and therefore, the level of accuracy, and the level of efficiency, at which these holes are formed, are substantially higher than those at which these holes are formed by the liquid ejection element manufacturing method in accordance with the prior art. Thus, as long as the above described manufacturing conditions are met, the numerical order in which the step for forming the through electrodes and the step for forming the ink supply canal are carried out is optional. Also, the numerical order in which the step for forming the orifices and the step for simultaneously forming the through electrodes and ink supply canal are carried out is optional.

The effects of the above described embodiments of the present invention are as follows.

The heat generation resistors and electrical wires are formed on a substrate which is substantially thicker than a substrate used by a liquid ejection element manufacturing method in accordance with the prior art, and the substrate is reduced in thickness after the formation of the heat generation resistors and electrical wires on the substrate. Then, the through electrodes and ink supply canal are formed through the thinned substrate. Therefore, the length of time for forming the through holes for the through electrodes is substantially shorter, and the level of accuracy at which the through holes are formed through the substrate is substantially higher. Therefore, not only can the through holes be arranged at a higher level of density and for a lower cost, but also, the ink supply canal is formed at a higher level of accuracy. Further, the amount of the deviation in the distance between each of the heat generation resistors, and the ink supply is smaller, and therefore, the liquid ejection element is better in ink ejection performance. Further, the liquid ejection element manufacturing method in accordance with the present invention can form an ink supply canal smaller than that formable by the method by the prior art, making it thereby possible to yield a liquid ejection element (chip) smaller, being therefore lower in cost, than that which can be yielded by the method in accordance with the prior art. Further, the method in accordance with the present invention makes it possible to form the ink supply canal and the through holes for the through electrodes at the same time, making it thereby possible to halving the length of time necessary for processing the substrate for forming them. Therefore, the processing cost can be substantially reduced.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 210086/2004 filed Jul. 16, 2004 which is hereby incorporated by reference.

What is claimed is:

1. A manufacturing method for manufacturing an element substrate including energy generating means for generating energy for ejecting liquid, an electrode layer electrically connected to the energy generating means, and a penetrating electrode electrically connected to the electrode layer, said manufacturing method comprising the steps of:

providing the energy generating means and the electrode layer on a first surface of a substrate;

thinning the substrate from a second surface which is opposite the first surface;

forming a through hole through the substrate thinned by said thinning step from the second surface thereof; and filling electroconductive material into the through hole to form the penetrating electrode.

2. The method according to claim 1, further comprising providing an opening penetrating the substrate thinned by said thinning step from the first surface to the second surface to provide a liquid supply opening for supplying liquid, wherein said forming step and said liquid supply opening step are performed contemporarily.

3. The method according to claim 1, wherein the penetrating electrode penetrates through the thinned substrate from the first surface to the second surface.

4. The method according to claim 1, wherein said forming step is performed such that the through hole reaches the electrode layer.

5. The method according to claim 1, wherein a thickness of the substrate thinned by said thinning step is 50 μm-300 μm.

6. The method according to claim 1, wherein said through hole is formed by partly removing the thinned substrate through a dry etching method, a laser machining method or an ultrasonic wave method.

7. A manufacturing method for manufacturing an element substrate including energy generating means for generating energy for ejecting liquid, an electrode layer electrically connected to the energy generating means, a penetrating electrode electrically connected to the electrode layer, and a member having an ejection outlet, said manufacturing method comprising the steps of:

providing the energy generating means and the electrode layer on a first surface of a substrate;

thinning the substrate from a second surface which is opposite the first surface;

forming a through hole through the substrate thinned by said thinning step from the second surface thereof; and filling electroconductive material into the through hole to form the penetrating electrode; and providing the member on the first surface of the substrate thinned by said thinning step.

8. The method according to claim 7, further comprising a step of providing a protection layer for protecting the member, and a step of removing the protection layer after said digging step.

9. A manufacturing method for manufacturing an element substrate including energy generating means for generating energy for ejecting liquid, an electrode layer electrically connected to the energy generating means, and a penetrating electrode electrically connected to the electrode layer, said manufacturing method comprising the steps of:

providing a substrate having the energy generating means and the electrode layer on a first surface of the substrate;

thinning the substrate from a second surface which is opposite the first surface;

forming a through hole through the substrate thinned by said thinning step from the second surface thereof; and filling electroconductive material into the through hole to form the penetrating electrode.

* * * * *